US012609514B2

(12) United States Patent
Duquesne et al.

(10) Patent No.: US 12,609,514 B2
(45) Date of Patent: Apr. 21, 2026

(54) ELECTRICAL CONDUCTOR FOR A ROTATING ELECTRICAL MACHINE WOUND COMPONENT

(71) Applicant: VALEO EQUIPEMENTS ELECTRIQUES MOTEUR, Creteil (FR)

(72) Inventors: Jean Duquesne, Etaples-sur-Mer (FR); Vincent Ramet, Etaples-sur-Mer (FR); Stephane De-Clercq, Etaples-sur-Mer (FR); Humberto Teles De Menezes, Etaples-sur-Mer (FR); Denis Bodin, Etaples-sur-Mer (FR); Claire Schayes, Etaples-sur-Mer (FR)

(73) Assignee: VALEO EQUIPEMENTS ELECTRIQUES MOTEUR, Creteil Cedex (FR)

( * ) Notice: Subject to any disclaimer, the term of this patent is extended or adjusted under 35 U.S.C. 154(b) by 463 days.

(21) Appl. No.: 17/787,550

(22) PCT Filed: Dec. 14, 2020

(86) PCT No.: PCT/EP2020/086051
§ 371 (c)(1),
(2) Date: Jun. 20, 2022

(87) PCT Pub. No.: WO2021/122488
PCT Pub. Date: Jun. 24, 2021

(65) Prior Publication Data
US 2022/0385048 A1 Dec. 1, 2022

(30) Foreign Application Priority Data
Dec. 20, 2019 (FR) ...................................... 1915180

(51) Int. Cl.
| | |
|---|---|
| *H02K 3/52* | (2006.01) |
| *H02G 1/12* | (2006.01) |
| *H02K 15/33* | (2025.01) |

(52) U.S. Cl.
CPC ............. *H02G 1/128* (2013.01); *H02K 15/33* (2025.01); *H02K 3/522* (2013.01)

(58) Field of Classification Search
CPC .... H02G 1/128; H02K 15/0068; H02K 3/522; H02K 3/04; H02K 3/14; H02K 15/0414; H02K 15/063; H02K 2213/03
See application file for complete search history.

(56) References Cited

U.S. PATENT DOCUMENTS

| | | |
|---|---|---|
| 2003/0159269 A1 | 8/2003 | Lenoir et al. |
| 2013/0300246 A1 | 11/2013 | Kaimori et al. |

(Continued)

FOREIGN PATENT DOCUMENTS

| | | |
|---|---|---|
| EP | 2 660 956 A1 | 11/2013 |
| FR | 3 081 631 A1 | 11/2019 |

(Continued)

OTHER PUBLICATIONS worldwide.espacenet.com translation of JP2007290013A (Year: 2007).*

(Continued)

*Primary Examiner* — Thomas Truong
(74) *Attorney, Agent, or Firm* — Oblon, McClelland, Maier & Neustadt, L.L.P.

(57) ABSTRACT
An electrical conductor for a rotating electrical machine wound component includes a body formed of an electrically conductive material and a coating layer formed of an electrically insulating material, the coating layer partially covering the body. The conductor is formed of a first portion, referred to as the main portion, in which the body is covered by the coating layer, a second portion, referred to as the (Continued)

intermediate portion, in which the body is covered with residue of the coating layer, and a third portion, referred to as the stripped portion, in which the body is bare. The intermediate portion is arranged between the main portion and the stripped portion.

18 Claims, 3 Drawing Sheets

(56) References Cited

U.S. PATENT DOCUMENTS

| | | | |
|---|---|---|---|
| 2017/0346358 A1 | 11/2017 | Fukuda et al. | |
| 2020/0212602 A1* | 7/2020 | Tachibana | H01R 4/021 |
| 2020/0328647 A1* | 10/2020 | Katsuragi | H02K 3/38 |

FOREIGN PATENT DOCUMENTS

| | | | |
|---|---|---|---|
| JP | 6-139837 A | 5/1994 | |
| JP | 2007290013 A * | 11/2007 | H02G 1/128 |
| JP | 2009-99689 A | 5/2009 | |
| WO | WO 02/069472 A1 | 9/2002 | |
| WO | WO 2007/125677 A1 | 11/2007 | |
| WO | WO-2009050164 A1 * | 4/2009 | H02G 1/1295 |

OTHER PUBLICATIONS

International Search Report issued Feb. 11, 2021 in PCT/EP2020/086051 filed on Dec. 14, 2020, citing documents AA-AC & AO-AR therein, 2 pages.

Combined Chinese Office Action and Search Report issued on Jun. 26, 2023 in Chinese Patent Application No. 202080086515.1 (with English translation), 13 pages.

Japanese Office Action issued on Aug. 18, 2023 in Japanese Patent Application No. 2022-537525 (with English translation), citing references 15 & 16 therein, 9 pages.

* cited by examiner

ELECTRICAL CONDUCTOR FOR A ROTATING ELECTRICAL MACHINE WOUND COMPONENT

The invention relates in particular to an electrical conductor for a wound component of a rotary electric machine.

The invention is particularly advantageously applicable in the field of rotary electric machines such as alternators, starter-alternators, or even reversible machines or electric motors. It will be recalled that a reversible machine is a rotary electric machine which is able to operate reversibly, on the one hand as an electric generator when functioning as an alternator and on the other hand as an electric motor, for example for starting the combustion engine of the motor vehicle.

A rotary electric machine comprises a rotor which can rotate about an axis, and a fixed stator. In alternator mode, when the rotor is rotating, it induces a magnetic field at the stator, which converts it into electric current in order to supply power to the electrical consumers of the vehicle and to recharge the battery. In motor mode, the stator is supplied with electric power and induces a magnetic field driving the rotor in rotation, for example in order to start the combustion engine.

The stator comprises a body having a yoke forming a component with rotational symmetry about an axis passing through the center of the stator. The body has teeth radially extending from the yoke toward the center of the stator and around which an electrical winding is positioned. More particularly, the teeth delimit slots between them, through which electrical conductors pass which are involved in forming the winding of the stator.

The winding is formed from a plurality of electrical conductors also called conductive pins, which are partially housed in the slots of the body and electrically connected in pairs via their ends in order to form a continuous electrical path generating magnetic fields along the teeth of the body when an electric current flows through them. In other words, the electrical conductors are connected in pairs so as to form various assemblies, and each assembly can in particular correspond to an electrical power supply phase.

In order to connect the electrical conductors in pairs, it is common to use a welding method, and in particular a laser welding method. This laser welding step can be performed only if the electrical conductors are bared beforehand. Specifically, each electrical conductor has a body formed from an electrically conductive material which is covered by an electrically insulating coating layer also called enamel. This coating layer must be locally removed before performing the laser welding step.

There are several methods for removing the coating layer. It is, for example, possible to use a mechanical removal method such as the passage of a blade or an abrasive means. These mechanical methods have a long cycle time and generate dust and/or significant amounts of residue of insulating material which can cause problems during the operation of the machine and can be unsuitable for small conductor cross sections.

The present invention aims to make it possible to avoid the drawbacks of the prior art by proposing a method for baring electrical conductors which is inexpensive, suitable for a process having a restricted cycle time while at the same time limiting the risks of the remaining insulating coating layer burning or the risks of a fault in the welding together of the conductors and does not generate a large amount of dust and/or residue.

To this end, one subject of the present invention is therefore an electrical conductor for a wound component of a rotary electric machine having a body formed from an electrically conductive material and a coating layer formed from an electrically insulating material, said coating layer partially covering the body. According to the present invention, the conductor is formed: from a first portion, referred to as the main portion, in which the body is covered by the coating layer, from a second portion, referred to as the intermediate portion, in which the body is covered by residue from the coating layer, and from a third portion, referred to as the bared portion, in which the body is bare, the intermediate portion being arranged between the main portion and the bared portion. What is meant by "bare" is that the body is totally free of coating layer.

There being an intermediate portion arranged between the main portion and the bared portion makes it possible to create a separation between said regions, and in particular between the coating layer and the place where the welding will be performed. This makes it possible not to damage the coating layer of the main portion and thus not to generate a risk of an electrical short circuit.

There being an intermediate portion of the conductor which is not completely bared next to the bared portion, which will subsequently be welded, does not impede the following laser welding step, which is performed only on the bared portion. The intermediate portion therefore does not reduce the efficacy of the welding process. In addition, not totally baring the whole surface area of the end of the electrical conductor makes it possible to optimize the cycle time of the baring process and using a laser baring method makes it possible to limit the release of dust which could impair the operation of the machine and interfere with the welding step.

According to one embodiment, the bared portion extends only over part of the periphery of said conductor. This also makes it possible to optimize the cycle time of the baring process by providing for only the part which is really useful for welding to be totally bared.

According to one embodiment, the bared portion is smaller than the intermediate portion. This makes it possible to optimize the distance between the bared portion, which the welding laser will be pointed at, from the main portion, comprising the coating layer.

According to one embodiment, the intermediate portion extends over an axial height of at least 1 mm.

According to one embodiment, the conductor has a central part formed from the main portion and two ends, each of said ends having an intermediate portion and a bared portion.

According to one embodiment, the body of the electrical conductor is formed from copper.

According to one embodiment, the coating layer is formed from an organic material.

According to one embodiment, the conductor has a rectangular cross section. In this embodiment, the bared portion extends only over at least some of three lateral faces of the conductor. In other words, one of the lateral faces of the conductor has no bared portion.

According to one embodiment, the bared portion forms a lateral end of part of the conductor.

According to one embodiment, the bared portion is in the shape of a cylinder portion. This shape makes it possible to minimize the bared region as much as possible and therefore to optimize the cycle time of the process while at the same time eliminating the coating layer.

According to one embodiment, the axial end surface of the conductor is formed from the bare body.

Another subject of the present invention is a wound component for a rotary electric machine having a body forming slots and a plurality of electrical conductors, as previously described, housed in said slots. The wound component can, advantageously, form a stator or rotor of a rotary electric machine.

Another subject of the present invention is a rotary electric machine having a wound component as previously described. The rotary electric machine can, advantageously, form an alternator, a starter-alternator, a reversible machine or an electric motor.

Another subject of the present invention is a process for baring at least one electrical conductor as previously described, comprising: a first step of baring the intermediate portion and the bared portion, said step being performed with a first laser beam having a first wavelength, and a second step of baring only the bared portion, said step being performed with a second laser beam having a second wavelength which is different from said first wavelength.

Such a process makes it possible to optimize the cycle time for baring the conductor while at the same time limiting the release of dust which could impair the operation of the machine and interfere with the welding step.

According to one embodiment, the first wavelength is greater than the second wavelength.

According to one embodiment, the first baring step is carried out using an infrared laser such as a carbon dioxide or argon laser.

According to one embodiment, the second baring step is carried out using a laser of YAG (yttrium aluminum garnet) type.

According to one embodiment, the conductor has a rectangular cross section and one face of said conductor is arranged so as to form an angle of between 20° and 70° with respect to a laser head emitting the first laser beam or the second laser beam. This makes it possible for the laser beam emitted by said laser head to be able to reach at least two faces of the conductor. Thus, during the same baring step, several faces of the conductor can be bared without the conductor or the laser head moving.

According to one embodiment, the process further comprises a step of orienting the first laser beam or the second laser beam, said step being performed by means of an orientation device so as to orient the corresponding laser beam toward the associated portion of the conductor.

According to one embodiment, the laser head is equipped with an orientation device for orienting the laser beam so that the laser beam sweeps over at least two faces of the conductor during the same baring step. In this embodiment, the laser head remains stationary during the sweep.

According to one embodiment, the orientation device is arranged to orient the corresponding laser beam toward corresponding portions of several electrical conductors one after the other.

According to one embodiment, the orientation device has at least one mirror which makes it possible to orient the laser beam.

According to one embodiment, the orientation device further has at least one telescope which makes it possible to modify the focal length of the laser beam. This makes it possible to bare several conductors arranged at various distances from the laser head.

According to one embodiment, the first laser beam is emitted by a first laser head and the second laser beam is emitted by a second laser head. This also makes it possible to optimize the cycle time for baring the conductor by avoiding having to change the settings of the laser head in order to carry out the two baring steps.

According to one embodiment, the orientation device is arranged between the laser head and the conductor to be bared.

The present invention can be better understood upon reading the following detailed description of non-limiting exemplary implementations of the invention and upon studying the appended drawings.

Identical, similar or analogous elements retain the same references from one figure to another. It will also be noted that the various figures are not necessarily to the same scale. In addition, the exemplary embodiments which are described below are in no way limiting. It is in particular possible to envision variants of the invention comprising only a selection of the features described below, in isolation from the other features described.

Figure 1:
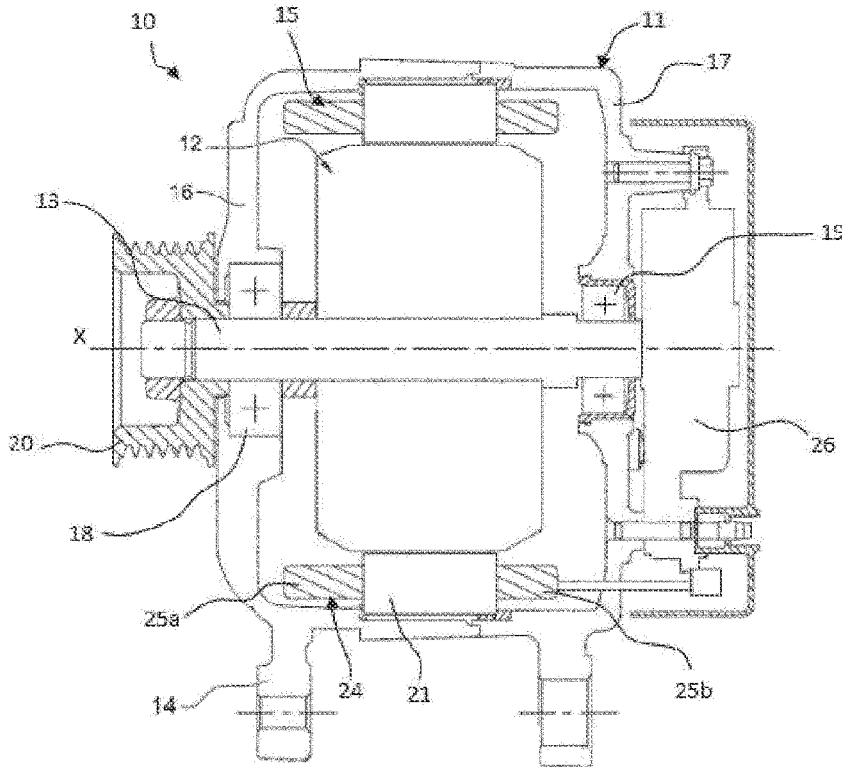
FIG. 1 shows a schematic and partial cross-sectional view of a rotary electric machine according to one exemplary implementation of the invention.

FIG. 1 shows an exemplary compact multi-phase rotary electric machine 10, in particular for a motor vehicle. This machine 10 converts mechanical energy into electrical energy, in alternator mode, and can operate in motor mode in order to convert electrical energy into mechanical energy. This rotary electric machine 10 is, for example, an alternator, a starter-alternator, a reversible machine or an electric motor.

In this example, the machine 10 has a casing 11. Inside this casing 11, it further has a shaft 13, a rotor 12 which rotates as one with the shaft 13 and a stator 15 surrounding the rotor 12. The rotational movement of the rotor 12 is performed about an axis X. In the remainder of the description, the axial direction corresponds to the axis X, passing through the center of the shaft 13, whereas the radial orientations correspond to planes which are concurrent, and in particular perpendicular, to the axis X. For the radial directions, the label "internal" corresponds to an element oriented toward the axis, or closer to the axis with respect to a second element, the label "external" denoting separation from the axis.

In this example, the casing 11 has a front end plate 16 and a rear end plate 17 which are joined together. These end plates 16, 17 are hollow in form and each centrally bear a bearing coupled to a respective ball bearing 18, 19 for the rotational mounting of the shaft 13. Furthermore, the casing 11 has fixing means 14 making it possible to mount the rotary electric machine 10 in the vehicle.

A drive member 20, such as a pulley or a sprocket, can be fixed to a front end of the shaft 13. This member makes it possible to transmit the rotational movement to the shaft or for the shaft to transmit its rotational movement. In the remainder of the description, the labels "front"/"rear" refer to this member. Thus, a front face is a face oriented in the direction of the member, whereas a rear face is a face oriented in the opposite direction to said member.

The front end plate 16 and the rear end plate 17 are in this case arranged so as to form a chamber for a coolant such as water or oil to flow through. Alternatively, the end plates could have openings for a cooling air flow to pass through which is generated by the rotation of at least one fan which rotates as one with the rotor or the shaft.

In this example, the rotor 12 is formed from a stack of laminations housing permanent magnets forming the magnetic poles. Alternatively, the rotor could be a claw rotor having two polar wheels and a rotor coil.

Figure 2:
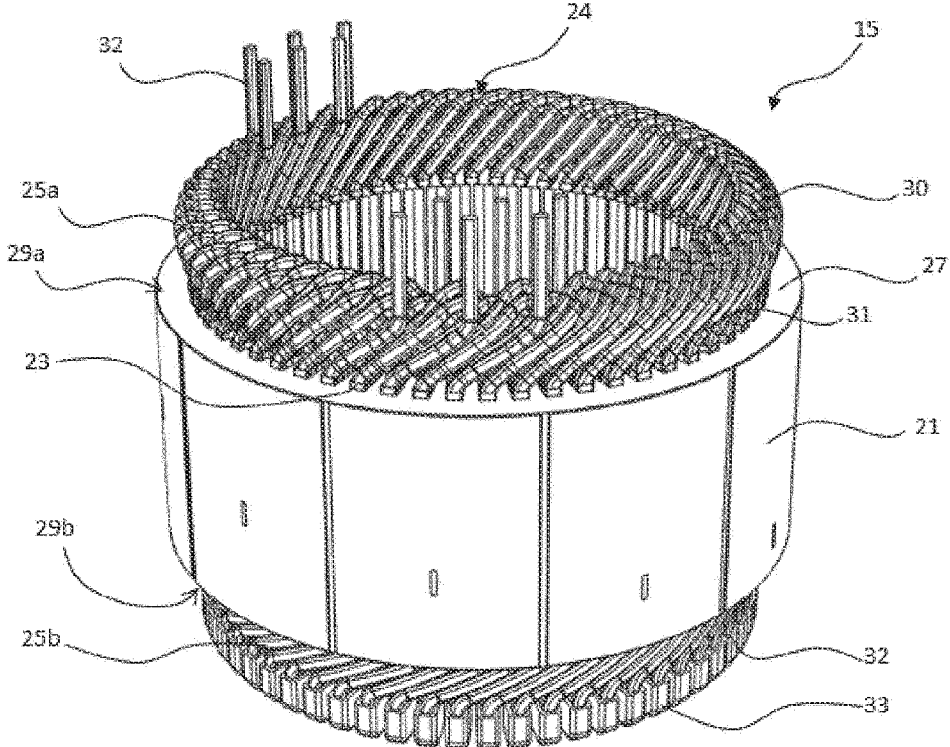
FIG. 2 shows a schematic and partial perspective view of a stator according to the example of FIG. 1.

In this exemplary embodiment, the stator 15, illustrated more exactly in FIG. 2, has a stator body 21 formed from a stack of laminations which is provided with slots 22 equipped with a slot insulator 23 for the mounting of an electrical winding 24. The winding passes through the slots of the body 21 and forms a front winding overhang 25a and a rear winding overhang 25b on either side of the body of the stator. Furthermore, the winding 24 is formed from one or more phases having at least one electrical conductor 30 and being electrically connected to an electronic assembly 26.

The electronic assembly 26, which is in this case mounted on the casing 11, has at least one electronic power module making it possible to control at least one phase of the winding 24. The power module forms a bridge voltage rectifier and an inverter in order to convert the generated AC voltage into a DC voltage, and vice versa. Alternatively, the electronic assembly could be remote from the machine.

The stator body 21 is formed from a yoke 27 of annular shape around the axis X and by a plurality of teeth 28 extending radially in the direction of the center of the stator from the yoke, and in particular in this case from a lateral face forming an internal wall of the yoke 27. The teeth 28 are evenly angularly distributed over the periphery of the annular body, with successive spaces formed between them so as to define the slots 22 extending in series over the periphery of the annular body of the stator, each slot being delimited by two successive teeth. According to the present example, the teeth delimit 48 slots distributed along the circumference of the stator body, these slots being arranged in order to form a support for the electrical winding 24. As a variant, a different number of slots can be used, such as 96, 84, 72, 60. It is understood that this number depends in particular on the application of the machine, the diameter of the stator and the number of poles of the rotor.

In the axial direction, that is to say the direction parallel to the axis X, the slots 22 are open on a first axial end face 29a and a second axial end face 29b of the stator body 21. In other words, the slots pass axially right through the body and open onto the two opposite axial end faces of the stator. What is meant by the term "axial end faces" are faces perpendicular or substantially perpendicular to the axis of rotation X of the stator.

Figure 3:
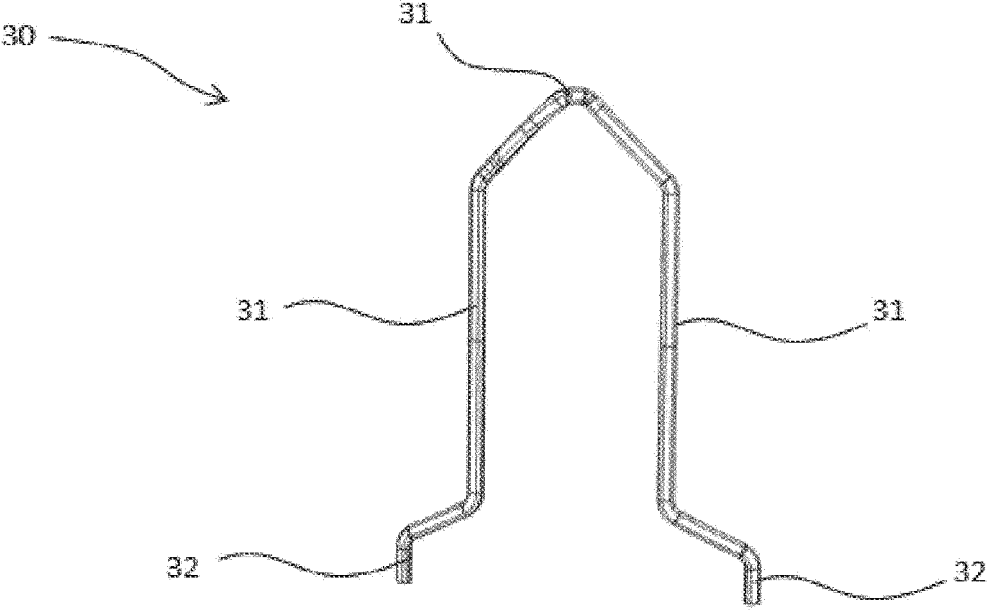
FIG. 3 shows a schematic and partial perspective view of an exemplary electrical conductor according to the invention.

The winding 24 is formed from a plurality of electrical conductors 30, commonly called pins, connected together electrically in order to form electrical paths forming the phases of the winding. FIG. 3 illustrates an exemplary electrical conductor 30. The following description is given with reference to one electrical conductor but it is understood that this preferably applies to all the electrical conductors forming the winding 24.

The conductor 30 is formed from a central part 31 and two ends 32, the ends extending on either side of the central part. The central part can be in a substantially straight I shape extending partially in a slot 22. Alternatively, the central part can be in a U shape having two straight portions each extending partially in a respective slot 22. The two alternatives described above can be present for different conductors of the same phase of the winding 24.

Each slot 22 has several radially aligned central parts 31 forming various layers, the central parts of the same slot belonging to different electrical conductors 30. Each central part 31 projects in the two opposite axial directions on either side of the stator body 21. The ends 32 of each of the conductors extend, on either side, the central part of the corresponding conductor outside the body 21 of the stator. The ends of the conductors to be connected together are arranged adjacent to one another, for example in a radial direction.

Figure 4:
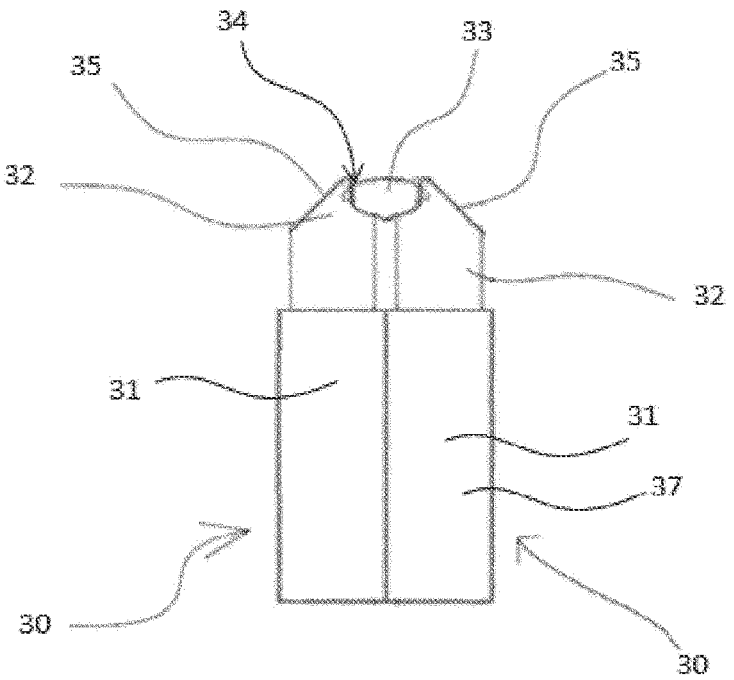
FIG. 4 shows a schematic and partial side view of two ends of different electrical conductors welded together.

As illustrated in FIG. 4, two ends belonging to different conductors are connected together. More specifically, each of the ends 32 of a conductor 30 is electrically connected to a respective end of one of the other conductors forming the phase. The electrical connection between the two ends is made in particular by welding. Thus, a spot weld 33 is formed between the two ends 32. The spot welds provide the electrical connections between the electrical conductors 30 in order to form the winding 24.

In the example illustrated in FIG. 4, each end 32 of an electrical conductor has a chamfer 35 reducing the cross section of the conductor. The spot weld 33 is formed on the part of the end 32 not comprising a chamfer. For example, each spot weld penetrates a window 34 of generally rectangular shape, formed during the welding step, extending between the chamfers 35 of the two conductors 30 to be welded.

The conductor 30 has a body 36 made from electrically conductive material such as copper. The body 36 is at least partially covered by a coating layer 37 made from electrically insulating material such as enamel or an electrically insulating organic material.

Figure 5:
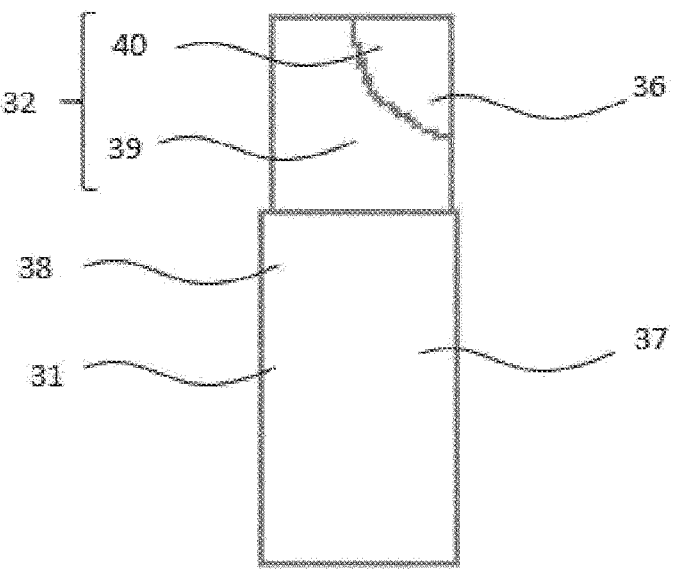
FIG. 5 shows a schematic and partial side view of part of the electrical conductor of FIG. 4.
Figure 6:
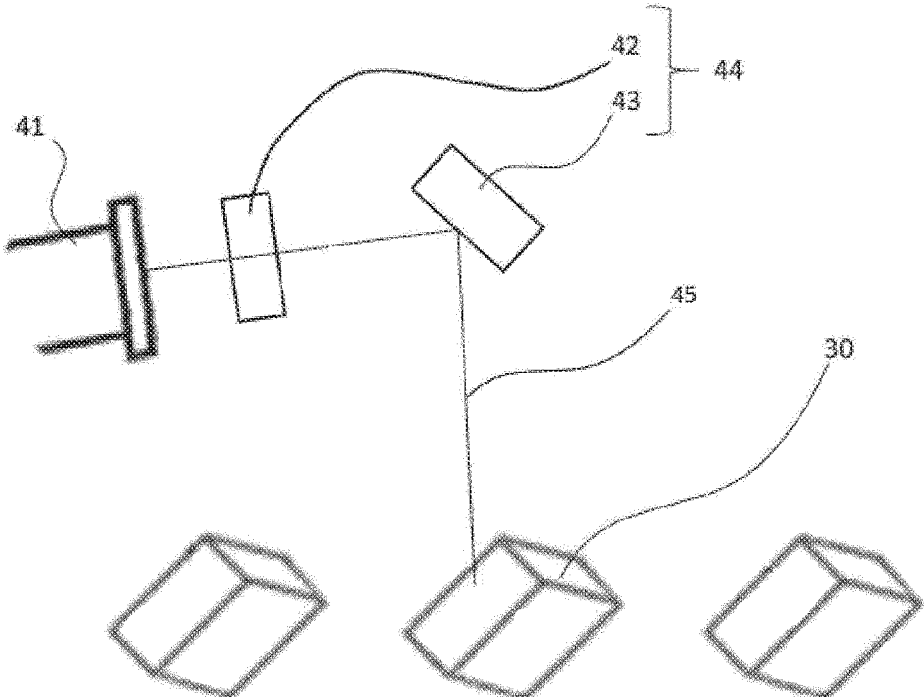
FIG. 6 shows a schematic and partial perspective view of exemplary equipment for the baring process.

FIG. 5 illustrates part of a conductor 30, and more specifically part of the central part 31 as well as an end 32 extending said central portion. The central part 31 forms a main portion 38 of the conductor, in which portion the body 36 is covered by the coating layer 37. The end 32 has an intermediate portion 39 in which the body 36 is covered by residue from the coating layer 37 and a bared portion 40 in which the body 36 is bare. In the bared portion 40, the body 36 is therefore not covered by the coating layer 37. Thus, an external surface of the main part 38 is electrically insulated, whereas an external surface of the bared part 40 is electrically conductive. The main parts 38 of several conductors 30 can be in contact with one another, and in particular in the slots 22, without creating a short circuit in the winding 24.

Each end 32 extends along an axis substantially parallel to the axis X of the machine 10. The total cross-sectional area of the main portion 38 is greater than the total cross-sectional area of the bared portion 40, said cross sections each being taken in a radial plane with respect to the axis.

The intermediate portion 39 can be arranged between the main portion 38 and the bared portion 40. More specifically, the intermediate portion 39 is, in this case, interposed axially between the main portion 38 and the bared portion 40.

The bared portion 40 can form a lateral end of part of the conductor 30. Preferably, the bared portion 40, and in particular said lateral end, of a first conductor 30 is arranged opposite a bared portion, and in particular a lateral end, of a second conductor, the two conductors being intended to be welded to one another.

The bared portion 40 has a smaller surface area than that of the intermediate portion 39.

In this example, the bared portion 40 extends only over part of the periphery of the end 32 of the conductor. For example, a cross section, in a radial plane, of the conductor 30 comprises both a part corresponding to the bared portion 40 and a part corresponding to the intermediate portion 39.

In the example of FIGS. 4 and 5, the ends 32 are illustrated with a side view in a circumferential direction.

Still in this example, the conductor 30 has a cross section, in a radial plane, of generally rectangular shape. Thus, the thickness of the bared portion 40, measured in a circumferential direction with respect to the axis X, is less than the thickness of the main portion 38, also measured in a circumferential direction. Similarly, the width of the bared portion 40, measured in a radial direction with respect to the axis X, is less than the width of the main portion 38, also measured in a radial direction.

In this example, the bared portion 40 extends over three of the lateral faces of the conductor 30. In other words, one of the lateral faces of the conductor does not have a bared portion, that is to say that said lateral face does not have a portion where the body 36 of the conductor is bare. For example, the bared portion 40 is in the shape of a cylinder portion.

It will be understood that the shape and the dimensions of the bared portion depend on the application, the material of the body 36 and the dimensions of the conductor 30.

An exemplary process for producing a conductor 30 and, briefly, an electrical winding 24 is described below.

Subsequently to the step of mounting the conductive segments 30 in the slots 22 of the stator body 21, a step of baring the ends 32 of the conductors 30 is undertaken. Alternatively, this baring step can be performed after inserting the conductors 30 into the stator body 21.

In the example described in this case, the first step consists in producing a conductive coil. The coil is formed from a body produced from electrically conductive material covered by an insulating coating layer.

A second step consists in cutting a conductor 30 in the conductive coil. The conductive coil is formed from a continuous chain of conductive wire intended to become unified once cut. By virtue of this cutting step, the axial end surfaces of the conductor are formed from the bare body. The lateral faces of the conductor 30 are formed from the coating layer.

Before it being possible to carry out the welding step, it is necessary to bare the ends of the conductor 30, that is to say remove the electrically insulating coating layer as well as the residue from said coating layer. Specifically, if the welding step is not performed on a bare conductive material, this can cause porosity in the weld, which can weaken the electrical connection between the ends of the conductors.

The baring step is a laser baring step. Said baring step will be described in more detail below. The baring step is repeated at each of the ends of the conductor 30.

The conductors are then bent and/or inserted into the slots 22 of the stator body 21. The conductors can then be folded a second time in order to bring together, in pairs, the ends 32 of the conductors to be welded. Finally, said adjacent ends are connected together electrically in order to produce the electrical winding 24. This electrical connection between the adjacent ends 32 is produced by laser welding. More specifically, a laser beam is emitted in the direction of the axial end face of the bared portion 40. The bared portion 40, formed only from the body made from conductive material, will then melt and mix with the bared portion of the adjacent conductor in order to form the spot weld 33.

The aforementioned baring step comprises: a first step of baring the intermediate portion and the bared portion followed by a second step of baring only the bared portion.

The first baring step is performed by a first laser beam, which removes, in particular by burning, part of the coating layer 37. The first baring step in large part removes the coating layer 37 while at the same time leaving a thin layer of coating layer residue on the body 36. The layer of residue is mainly formed by dust from the coating layer 37. Thus, after this first baring step, the intermediate portion 39 and the bared portion have their body 36 covered by residue from the coating layer 37.

The first baring step is, for example, carried out using an infrared laser such as a carbon dioxide laser or an argon laser. The wavelength of the laser beam used in this example is between 2.7 micrometers and 15 micrometers and is in particular 4.3 micrometers or 9.4 micrometers or even 10.6 micrometers.

The second baring step is performed by a second laser beam, which removes and cleans the thin layer of residue from the coating layer 37 on the bared portion 40. Thus, the bared portion is formed only from the body 36 and no longer has a coating layer 37 or residue.

The second baring step is, for example, carried out using a laser of YAG (yttrium aluminum garnet) type. The wavelength of the laser beam used in this example is between 60 nanometers and 1070 nanometers, and in particular between 1030 nanometers and 1060 nanometers.

It will be understood that the wavelengths of the two laser beams depend on the application and the material of the body 36.

Each of the laser beams 45 is emitted by a corresponding laser head 41.

The previously described baring steps can be performed on a face of the conductor, and in particular the face of the conductor 30 extending opposite the laser head 41 emitting the associated laser beam 45.

Alternatively, in order to improve the cycle time of the baring process, the conductor of rectangular cross section can be arranged so that a face of said conductor forms an angle of between 20° and 70° with respect to the laser head 41 emitting the laser beam 45 associated with said baring step in progress. This angle is preferably of between 40° and 50°, and in particular equal to 45°. The laser head can then be equipped with an orientation device 44 for orienting the laser beam so that the laser beam 45 sweeps over two faces of the conductor 30 during the same baring step without the conductor or the laser head moving.

The orientation device 44 has at least one mirror 43 making it possible to orient the laser beam 45 in the correct direction without moving the laser head 41 so that the laser beam can reach several faces of the same conductor 30, and in particular two adjacent lateral faces. The orientation device 44 can also be arranged, using the mirror 43, to orient the corresponding laser beam toward the ends 32 of several electrical conductors one after the other. One of the baring steps can then be performed on several conductors 30 without the conductors or the laser head 41 moving. Preferably, the conductors 30 are in this case arranged parallel to one another.

The orientation device 44 can also have at least one telescope 42 making it possible to vary the distance between the laser head 41 and the conductor 30 to be bared without one of these elements moving. Preferably, the telescope 42 is arranged closer to the laser head 41 than the mirror 43. Preferably, the various conductors are arranged parallel to one another in order to make it possible to bare said conductors by limiting the movement of the orientation device 44.

The present invention is applicable in particular in the field of stators for an alternator or reversible machine, but it could also be applied to any type of rotary machine. Similarly, the invention could be applied to rotors of a rotary electric machine.

Of course, the preceding description has been given only by way of example and does not limit the field of the present invention, from which a departure would not be made by replacing the various elements with any other equivalents.

The invention claimed is:

1. An electrical conductor for a wound component of a rotary electric machine having a body formed from an electrically conductive material and a coating layer formed from an electrically insulating material, said coating layer partially covering the body; the conductor being wherein it is formed:
   a. from a first portion, referred to as the main portion, in which the body is covered by the coating layer,
   b. from a second portion, referred to as the intermediate portion, in which the body is covered by residue which comprises remaining dust from burning the coating layer, and
   c. from a third portion, referred to as the bared portion, in which the body is bare with the remaining dust from burning the coating layer removed, the intermediate portion being arranged between the main portion and the bared portion.

2. The electrical conductor as claimed in claim 1, wherein the bared portion extends only over part of a periphery of said conductor.

3. A wound component for a rotary electric machine having a body forming slots and a plurality of electrical conductors as claimed in claim 2 housed in said slots.

4. A method for baring at least one electrical conductor as claimed in claim 2, comprising:
   a. a first step of baring the intermediate portion and the bared portion, said step being performed with a first laser beam having a first wavelength, and
   b. a second step of baring only the bared portion, said step being performed with a second laser beam having a second wavelength which is different from said first wavelength.

5. The electrical conductor as claimed in claim 1, wherein the bared portion is smaller than the intermediate portion.

6. A wound component for a rotary electric machine having a body forming slots and a plurality of electrical conductors as claimed in claim 5 housed in said slots.

7. A method for baring at least one electrical conductor as claimed in claim 5, comprising:
   a. a first step of baring the intermediate portion and the bared portion, said step being performed with a first laser beam having a first wavelength, and b. a second step of baring only the bared portion, said step being performed with a second laser beam having a second wavelength which is different from said first wavelength.

8. The electrical conductor as claimed in claim 1, wherein the bared portion forms a lateral end of part of the conductor.

9. A wound component for a rotary electric machine having a body forming slots and a plurality of electrical conductors as claimed in claim 8 housed in said slots.

10. A method for baring at least one electrical conductor as claimed in claim 8, comprising:
   a. a first step of baring the intermediate portion and the bared portion, said step being performed with a first laser beam having a first wavelength, and
   b. a second step of baring only the bared portion, said step being performed with a second laser beam having a second wavelength which is different from said first wavelength.

11. The electrical conductor as claimed in claim 1, wherein it has a rectangular cross section and in that the bared portion extends only over at least some of three lateral faces of the conductor.

12. A wound component for a rotary electric machine having a body forming slots and a plurality of electrical conductors as claimed in claim 11 housed in said slots.

13. A wound component for a rotary electric machine having a body forming slots and a plurality of electrical conductors as claimed in claim 1 housed in said slots.

14. A rotary electric machine comprising a wound component as claimed in claim 13.

15. A method for baring at least one electrical conductor as claimed in claim 1, comprising:
   a. a first step of baring the intermediate portion and the bared portion, said step being performed with a first laser beam having a first wavelength, and
   b. a second step of baring only the bared portion, said step being performed with a second laser beam having a second wavelength which is different from said first wavelength.

16. The baring method as claimed in claim 15, wherein the first wavelength is greater than the second wavelength.

17. The baring method as claimed in claim 16 the conductor has a rectangular cross section and in that one face of said conductor is arranged so as to form an angle of between 20° and 70° with respect to a laser head emitting the first laser beam or the second laser beam.

18. The baring method as claimed in claim 15, wherein the conductor has a rectangular cross section and in that one face of said conductor is arranged so as to form an angle of between 20° and 70° with respect to a laser head emitting the first laser beam or the second laser beam.

* * * * *